(12) United States Patent
Lambros

(10) Patent No.: US 8,944,455 B2
(45) Date of Patent: Feb. 3, 2015

(54) FOLDING DROP LEG FOR A TRAILER JACK

(76) Inventor: Mark L. Lambros, Lexington, NC (US)

( * ) Notice: Subject to any disclaimer, the term of this patent is extended or adjusted under 35 U.S.C. 154(b) by 0 days.

(21) Appl. No.: 13/506,003

(22) Filed: Mar. 20, 2012

(65) Prior Publication Data

US 2013/0249191 A1 Sep. 26, 2013

(51) Int. Cl.
B60S 9/02 (2006.01)
B60S 9/00 (2006.01)

(52) U.S. Cl.
CPC ..... B60S 9/00 (2013.01); B60S 9/02 (2013.01)
USPC .......................................................... 280/475

(58) Field of Classification Search
CPC ...................................................... B60S 9/02
USPC ............... 248/166, 176.1, 177.1, 178.1, 188, 248/188.7, 188.8, 354.1, 354.4, 371, 398, 248/676, 677; 280/5.3, 475, 754, 763.1, 280/764.1
See application file for complete search history.

(56) References Cited

U.S. PATENT DOCUMENTS

| 3,529,850 | A | * | 9/1970 | Montalto | .................. | 280/763.1 |
| 3,614,064 | A | | 10/1971 | Bennett | | |
| 4,176,825 | A | | 12/1979 | Schwebke | | |
| 4,662,610 | A | | 5/1987 | Cofer | | |
| 4,993,677 | A | | 2/1991 | Patterson | | |
| 5,711,504 | A | * | 1/1998 | Cusimano | .................. | 248/354.3 |
| 5,803,475 | A | | 9/1998 | Dick | | |
| 6,511,279 | B1 | | 1/2003 | Harkcom et al. | | |
| 7,396,034 | B2 | * | 7/2008 | Wilson, Jr. | .................... | 280/475 |
| 7,425,012 | B1 | | 9/2008 | Sease | | |
| 8,029,020 | B2 | | 10/2011 | Henson et al. | | |
| 8,201,807 | B2 | * | 6/2012 | Hernandez, Jr. | ............ | 254/93 H |

* cited by examiner

Primary Examiner — Joseph M Rocca
Assistant Examiner — Felicia L Brittman

(57) ABSTRACT

A folding drop leg for a trailer jack for supporting a trailer jack where added length is needed. The folding drop leg includes a base plate, a automatic locking swing plate, and a leg. The base plate is mounted to the bottom of the trailer's existing jack. The automatic locking swing plate is mounted to the base plate by use of a hinge pin and is swung upward when towing and dropped down to provide a stand for supporting the trailer when disengaged from the tow vehicle. The leg is mounted to the bottom of the automatic locking swing plate to add additional length to the existing jack leg rapidly when needed.

10 Claims, 4 Drawing Sheets

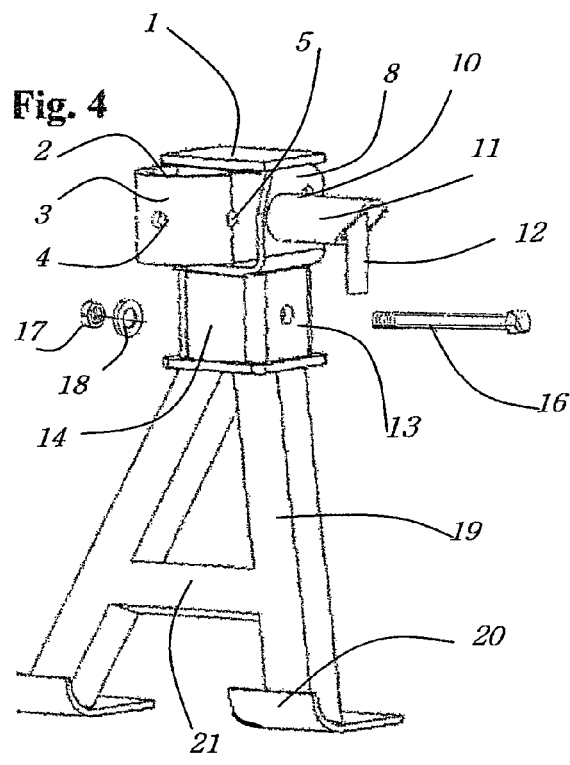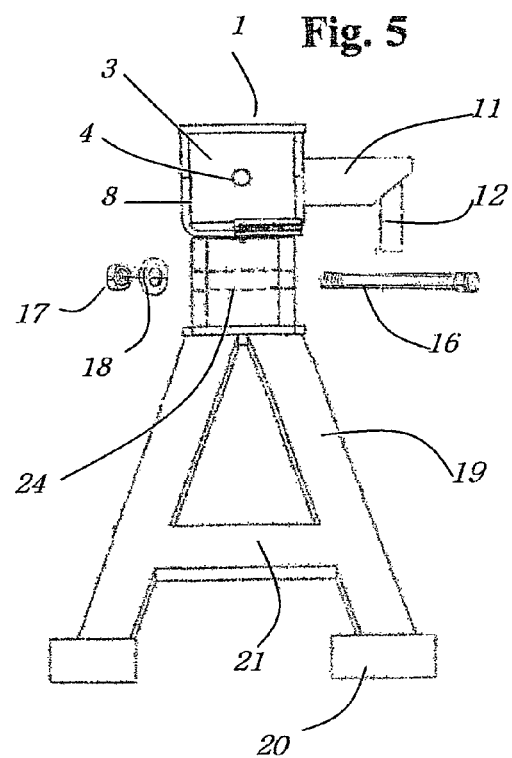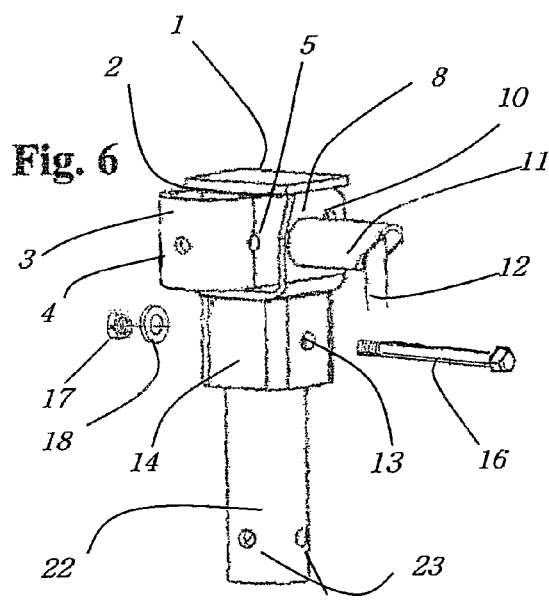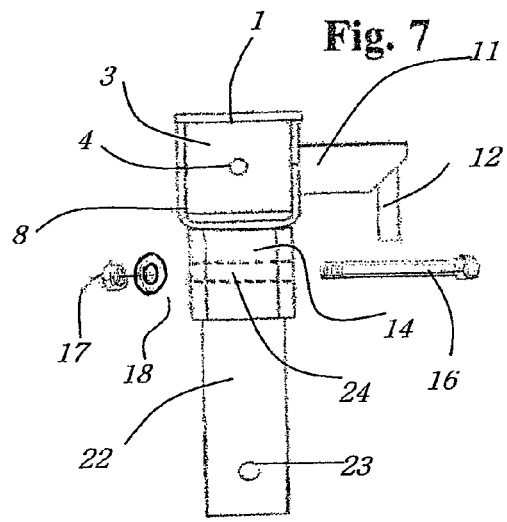

FOLDING DROP LEG FOR A TRAILER JACK

BACKGROUND OF THE INVENTION

1. Field of Invention

The present invention relates to a folding drop leg for a trailer jack that rapidly extends the length of the trailer's original jack leg to reduce the time and distance required to support or to level a trailer frame when necessary.

2. Description of Prior Art

Numerous innovations for trailer supporting devices have been provided in the prior art that will be described. Even though these innovations may be suitable for the specific individual purposes to which they address, however, they differ from the present invention.

A FIRST EXAMPLE, U.S. Pat. No. 8,029,020, Issued October 2011, to Henson, A trailer jack stand for supporting a trailer comprising: a pedestal stand, where stand attaches to a trailer jack, said stand includes a top connecting section and a pivoting section; a center mount pin, where the mount pin attaches the stand to the jack through the top connecting section; a locking pin, where the locking pin secures the mount pin into place; a platform, where the platform attaches to the bottom of the pivoting section; and a spring assembly, where the spring assembly includes a top pivot pin extending from the top connecting section, a stand pin extending from the pivoting section and a spring attached between the pivot pin and stand pin. The pivoting section is capable of pivoting between a retracted position and an extended position, wherein the extended position the stand supports the trailer.

A SECOND EXAMPLE, U.S. Pat. No. 7,425,012, Issued September 2008, to Sease, A trailer with an improved jack stand to selectively allow the stand to rest on the ground with either a foot pedestal or a ground engaging roller.

A THIRD EXAMPLE, U.S. Pat. No. 6,511,279, Issued January 2003, to Harkcom, A transporter for use in transporting a harvesting machine having a laterally movable tongue is disclosed wherein the transporter has a jack on the forward end thereof to be deployed during the loading process for improved stability. The jack includes components that lock the jack in place when a load is applied to the jack and unlocks the jack when that load is removed, allowing it to pivot to the rear to a transport position without manual intervention.

A FOURTH EXAMPLE, U.S. Pat. No. 5,803,475, issue September 1998, to Dick, A receiver hitch step attachment mounts to the existing receiver hitch of a pickup truck and supports a set of steps that are adjustable laterally and vertically. An auxiliary stabilizer leg is provided for engaging the ground beneath the attachment when the truck is parked in order to support the vehicle against rocking when weight is applied to the steps or when moving about in the camper.

A FIFTH EXAMPLE, U.S. Pat. No. 4,993,677, Issued February 1991, to Patterson, A support leg for trailer tongues which comprises an L-shaped ground support leg having a horizontal portion of square cross-section, a leg mounting bracket having a hollow cylindrical interior capped at one end and open at the other end with a circular cross-section of sufficient diameter to telescopically and rotatively receive the horizontal leg portion and terminating at its closed end in an internal leg-locking cavity of square cross-section, said internal cavity being adapted to telescoping receive said horizontal leg portion and restrain said horizontal leg portion against rotative movement, whereby said horizontal leg portion may be withdrawn from said internal leg locking cavity and rotate in said hollow cylindrical interior from a retracted to an extended position and vice versa and then telescopically inserted back into the internal cavity for locking engagement in the new position, a tension spring to resist telescoping disengagement of said leg horizontal portion from the internal leg locking cavity and a seal associated with the leg and the leg mounting bracket to effect an environmental seal.

A SIXTH EXAMPLE, U.S. Pat. No. 4,662,610, Issued May 1987, to Cofer, A jack stand or support for a trailer jack having a vertically extending housing and an extensible plunger telescopically contained by the depending end of the jack housing includes an upright member mounted on a flat base. A sleeve-like socket, in which the upper end of the upright member is telescopically received, is secured to the depending end of the jack plunger. The socket member is pivotally mounted in elongated slots formed in parallel strap jack stand to a stored travel position by rollers on the strap members contacting forwardly and rearwardly extending arcuate tracks, mounted on the jack housing, during retracting movement of the plunger into the housing.

A SEVENTH EXAMPLE, U.S. Pat. No. 4,176,825, Issued December 1979, to Schwebke, A jack device for boat trailers and the like includes a bracket which is attached to the trailer frame or trailer bed. An extensible and retractable telescoping leg pivoted on the bracket and has a length greater than the radius of the trailer wheel. When the leg is swung downwardly from a transport position to a lowered position, and the trailer is then moved, the leg will be pivoted and extended to a vertical load supporting position to support the trailer so that the wheel is elevated above the ground surface. Conversely, when the leg is swung to the transport position, a spring telescopically retracts the leg in the lowered load supporting position. A foot member pivoted to the leg assures planar contact of the leg with the ground surface.

A EIGHTH EXAMPLE, U.S. Pat. No. 3,614,064, Issued October 1971, to Bennett, The invention pertains to a stabilizing jack structure for mobile vehicles and the like, in which two telescopically arranged members are interconnected by a lever-operated actuating mechanism which can be operated to vary the degree of telescopic engagement of said members. The upper end of said telescopic members is arranged for pivotal connection to the underside of a mobile vehicle, while the lower end of the members carries a ground-engaging member. The jack structure is swing able as a unit from a working position, wherein it extends vertically downwardly from the vehicle on which it is mounted up to a transport position wherein it is disposed parallel to and closely adjacent the bottom of the vehicle. The jack structure is arranged to be locked in each of its said positions on the vehicle.

It is apparent that numerous innovations for trailer jacks have been provided here as examples and further in the Information Disclosure Statement provided that are adapted to be used. Furthermore, even though these innovations may be suitable for the specific individual purposes to which they address, however, they would not be suitable for the purposes of the present invention as heretofore described.

SUMMARY OF THE INVENTION

Accordingly, it is an object of the present invention to provide a folding drop leg for a trailer jack for extending the original jack's length rapidly in order to save time and effort when using said jack to support or level the trailer and avoids the disadvantages of prior art. The folding section is capable of moving between the retracted and extended position, where the in the extended position the leg supports the trailer and the retracted position allowing for towing the trailer. It does this by mounting to the trailer jack's existing leg with a base that is made up of two parts. This first part or base plate is mounted directly to the existing trailer jack using a bolt washer and nut placed through the hole in the present invention and passing through the hole in the trailer jack. The second part or the swing plate is connected to the first part with a hinge pin in a manner allowing it to be folded at the hinge pin both upward and downward stopping when the base plate is resting atop the hinge plate.

Briefly stated, another object of the present invention is to eliminate or improve the shortcomings of prior art jack extensions. Major areas of improvement are:

1. Because the extended leg or mast is made to the same specifications of the trailerjack's original leg, it allows the extended leg of the present invention to be used with any and all attachments which are designed to be used on a standard jack leg, such as a foot or a wheel without any modification to the attachment and using the same bolt, nut and washer that are used when mounting the attachments to the original jack's leg, saving both time and money over prior art.
2. Having a heavy duty a-frame leg for heavier applications than prior art that mounts to the base, allowing for a much broader application on a variety of trailers based on weight requirements. The broad stance of this leg allows for a much more stable contact with the ground on which it rest when extended than prior art and with heavier materials used in its construction able to support much more weight from the trailer than previously possible.
3. An automatic locking pin that engages whenever the leg is dropped for extension or raised for towing that keeps it securely in place. Being a spring loaded pin mounted to the swing plate that when retracted allows the swing plate to move freely and then by aligning itself with the hole in the mounting base by spring pressure, entering that hole locking the present invention in either position.

BRIEF DESCRIPTION OF DRAWINGS

FIG. 4 is a diagrammatic view of a folding drop leg for trailer jack assembly shown with a-frame leg inserted into leg mount body angled view in dropped or vertical extended position;

FIG. 5 is a diagrammatic view of a folding drop leg for trailer jack assembly shown with a-frame leg inserted into leg mount body forward view in dropped or vertical extended position;

FIG. 6 is a diagrammatic view of a folding drop leg for trailer jack assembly shown with mast leg inserted into leg mount body angled view in dropped or vertical extended position;

FIG. 7 is a diagrammatic view of a folding drop leg for trailer jack assembly shown with mast leg inserted into leg mount body forward view in dropped or vertical extended position;

Figure 1:
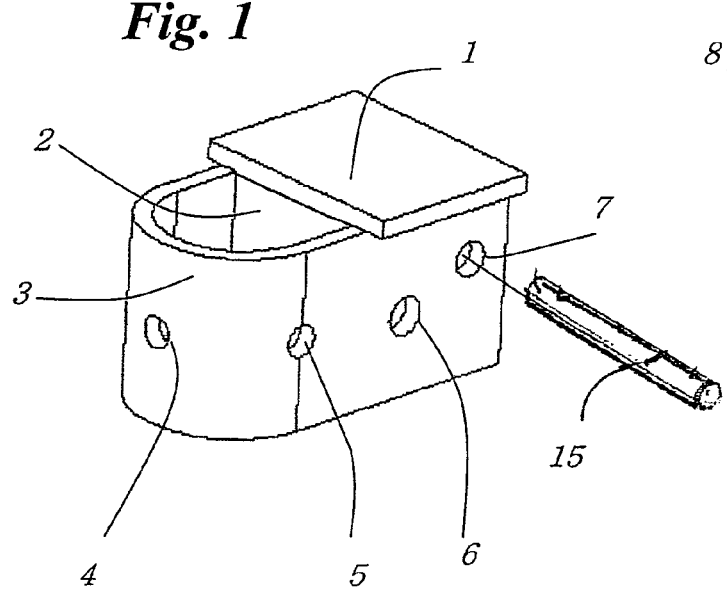
FIG. 1 is a diagrammatic view of mounting base plate shown with hinge pin.

LIST OF REFERENCE NUMERALS UTILIZED
IN THE DRAWING 1. top stop and support plate
2. mount support plate
3. outer mounting band
4. forward mounting hole
5. side mounting hole
6. down swing automatic locking hole
7. mounting base plate hinge pin hole
8. swing plate cradle
9. cradle hinge pin hole
10. opposing cradle hinge pin hole
11. automatic locking pin shell
12. automatic locking pin
13. leg mount hole
14. leg mount body
15. hinge pin
16. leg mounting bolt
17. leg mounting nut
18. leg mounting washer
19. a-frame leg
20. a-frame leg base foot
21. a-frame leg cross brace
22. mast leg
23. mast leg foot mounting hole
24. mast leg hole for mounting leg
25. automatic locking pin spring
26. automatic locking pin spring retaining washer
27. automatic locking pin spring binder and stop
28. leg mounting base
29. leg mounting base holes
30. retaining dimples

DETAILED DESCRIPTION OF THE DRAWINGS

Referring now to the figures, in which like numerals indicate like parts. FIG. 1 shows a view of the mounting base plate without the swing plate attached allowing for an open view of the top stop and support plate 1, which provides a stopping point for the swing plate cradle 8 when it is in the dropped or extended vertical position allowing for additional support of the trailer jack loaded weight. It allows a clear view of the down swing automatic locking hole 6 that the automatic locking pin will engage locking the swing plate in place when in the dropped or extended vertical position to prevent accidental raising or retraction of the swing plate while supporting the trailer jack loaded weight. The forward mounting hole 4 and the side mounting hole 5 shown allow the folding drop leg for a trailer jack to be mounted in either direction onto the bottom of the trailer jack, not shown, and the mount support plate 2 illustrated is added to create a surrounded space for the complete support in all directions of the mounting base plate to the trailer jack. The hinge pin 15 mounts through the mounting base plate unto the swing plate creating a hinge point allowing the swing plate to swing from the raised or retracted horizontal position to the dropped or extended vertical position while keeping the mounting base plate and the swing plate connected together.

Figure 2:
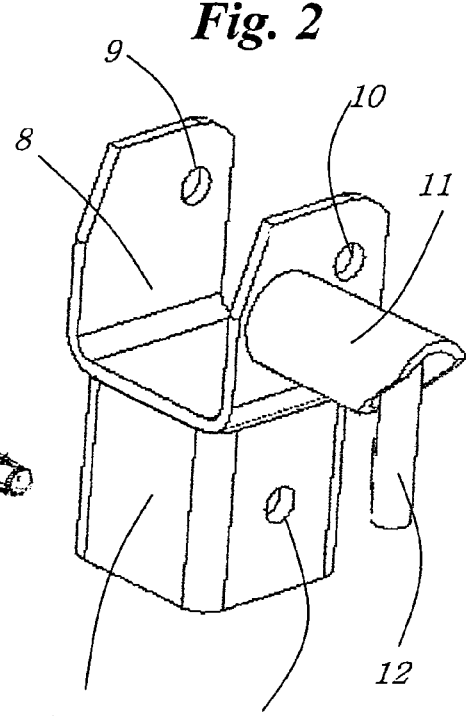
FIG. 2 is a diagrammatic view of a swing plate with leg mount body and automatic locking pin assembly.

FIG. 2 shows a view of the swing plate with leg mount body and automatic locking pin assembly not connected to the mounting base plate allowing a clear view of the cradle hinge pin hole 9 and the opposing cradle hinge pin hole 10 used to create a hinge point by using a hinge pin 15 between the mounting base plate and the swing plate to allow for movement between the raised or retracted horizontal position to the dropped or extended vertical position for the supporting of the trailer jack. Shown is the automatic locking pin shell 11 that is welded to the side of the swing plate cradle 8 using a weld seam. Within this automatic locking pin shell 11 is an automatic locking pin 12 which is spring loaded and allows the movement of the automatic locking pin 12 into the down swing automatic locking hole 6 in the mounting base plate when the two are aligned when hinged in the dropped or extended vertical position. Mounted to the swing plate cradle 8 is the leg mount body 14 by means of a welded seam. The leg mount body 14 is for mounting a leg to the swing plate by using the leg mount hole 13 to secure the leg, which can be either a mast 22 or an a-frame leg 19 depending on application.

Figure 3:
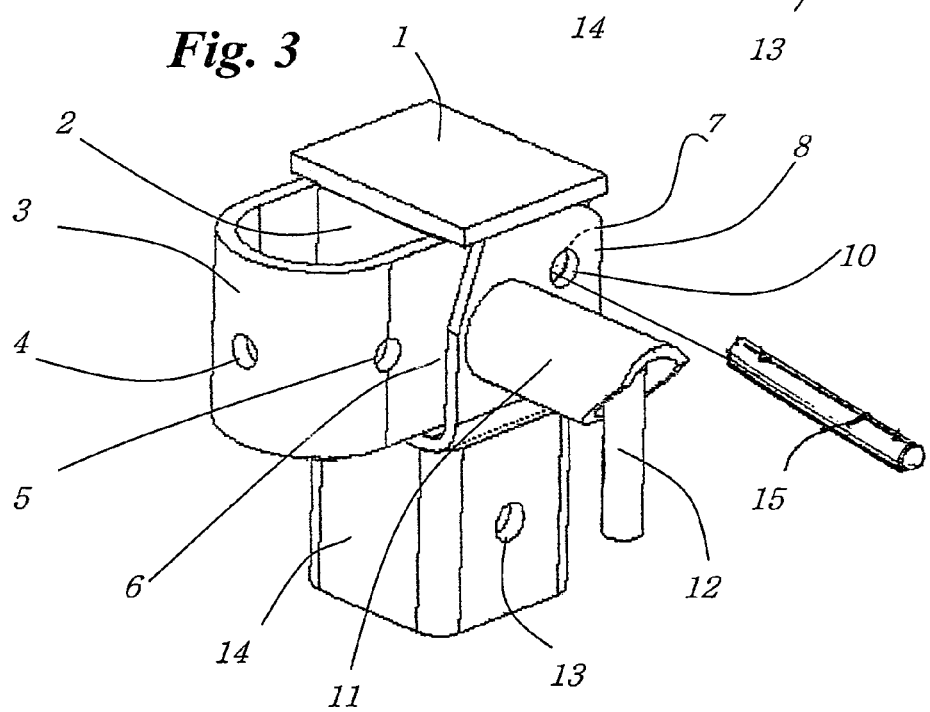
FIG. 3 is a diagrammatic view of a folding drop leg for trailer jack head assembly shown with hinge pin.

FIG. 3 shows the alignment of the mounting base plate depicted in FIG. 1 with the swing plate with leg mount body and automatic locking pin assembly depicted in FIG. 2 necessary to form a folding drop leg for trailer jack head assembly. Shown here with hinge pin assembled in the dropped or extended vertical position. The rotation of the swing plate cradle 8 is stopped and supported by the top stop and support plate 1 to prevent any further rotational movement of the hinge beyond the dropped or extended vertical position. It is held in this position by the alignment and the biasing of the automatic locking pin 12 into the down swing automatic locking hole 6 by means of spring pressure to prevent any accidental collapse of the folding drop leg for a trailer jack while in the dropped or extended vertical position and while supporting the trailer, not shown.

FIG. 4 shows the folding drop leg for trailer jack head assembly with a-frame leg 19 inserted into leg mount body 14 at an angled view in the dropped or extended vertical position. The a-frame leg 19 is mounted to the drop leg for trailer jack head assembly by the use of a leg mounting bolt 16 inserted through the leg mount hole 13 and the leg hole 24 and is secured into place by installing the leg mounting washer 18 and the leg mounting nut 17 onto the leg mounting bolt 16 accordingly. By combining the folding drop leg for trailer head assembly with the leg, it forms the complete folding drop leg for a trailer jack to be used as a means of supporting the trailer, not shown.

FIG. 5 shows the folding drop leg for trailer jack head assembly with a-frame leg 19 inserted into leg mount body 14 at a forward view in the dropped or extended vertical position. The a-frame leg 19 is mounted to the drop leg for trailer jack head assembly by the use of a leg mounting bolt 16 inserted through the leg mount hole 13 and the leg hole 24 and is secured into place by installing the leg mounting washer 18 and the leg mounting nut 17 onto the leg mounting bolt 16 accordingly. By combining the folding drop leg for trailer head assembly with the leg, it forms the complete folding drop leg for a trailer jack to be used as a means of supporting the trailer, not shown.

FIG. 6 shows the folding drop leg for trailer jack head assembly with a mast leg 22 inserted into leg mount body 14 at an angled view in the dropped or extended vertical position. The mast leg 22 is mounted to the drop leg for trailer jack head assembly by the use of a leg mounting bolt 16 inserted through the leg mount hole 13 and the leg hole 24 and is secured into place by installing the leg mounting washer 18 and the leg mounting nut 17 onto the leg mounting bolt 16 accordingly. By combining the folding drop leg for trailer head assembly with the leg, it forms the complete folding drop leg for a trailer jack to be used as a means of supporting the trailer, not shown.

FIG. 7 shows the folding drop leg for trailer jack head assembly with a mast leg 22 inserted into leg mount body 14 at a forward view in the dropped or extended vertical position. The mast leg 22 is mounted to the drop leg for trailer jack head assembly by the use of a leg mounting bolt 16 inserted through the leg mount hole 13 and the leg hole 24 and is secured into place by installing the leg mounting washer 18 and the leg mounting nut 17 onto the leg mounting bolt 16 accordingly. By combining the folding drop leg for trailer head assembly with the leg, it forms the complete folding drop leg for a trailer jack to be used as a means of supporting the trailer, not shown.

Figure 8:
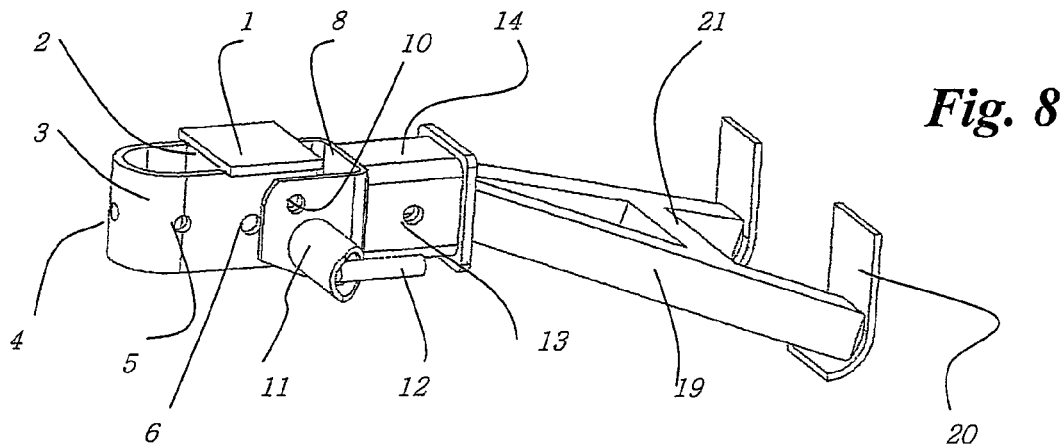
FIG. 8 is a diagrammatic view of a folding drop leg for trailer jack assembly shown with a-frame leg inserted into leg mount body angle view in raised or horizontal retracted position.

FIG. 8 shows the folding drop leg for trailer jack head assembly with a-frame leg 19 inserted into leg mount body 14 at an angled view in the raised or retracted horizontal position. The a-frame leg 19 is mounted to the drop leg for trailer jack head assembly by the use of a leg mounting bolt 16 inserted through the leg mount hole 13 and the leg hole 24 and is secured into place by installing the leg mounting washer 18 and the leg mounting nut 17 onto the leg mounting bolt 16 accordingly. By combining the folding drop leg for trailer head assembly with the leg, it forms the complete folding drop leg for a trailer jack and while retracted, is now ready for the trailer to be towed.

Figure 9:
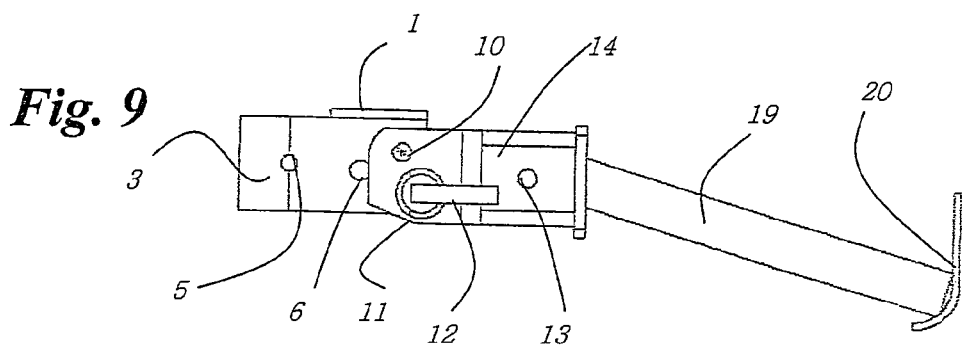
FIG. 9 is a diagrammatic view of a folding drop leg for trailer jack assembly shown with a-frame leg inserted into leg mount body side view in raised or horizontal retracted position.

FIG. 9 shows the folding drop leg for trailer jack head assembly with a-frame leg 19 inserted into leg mount body 14 at a side view in the raised or retracted horizontal position. The a-frame leg 19 is mounted to the drop leg for trailer jack head assembly by the use of a leg mounting bolt 16 inserted through the leg mount hole 13 and the leg hole 24 and is secured into place by installing the leg mounting washer 18 and the leg mounting nut 17 onto the leg mounting bolt 16 accordingly. By combining the folding drop leg for trailer head assembly with the leg, it forms the complete folding drop leg for a trailer jack and while retracted, is now ready for the trailer to be towed.

Figure 10:
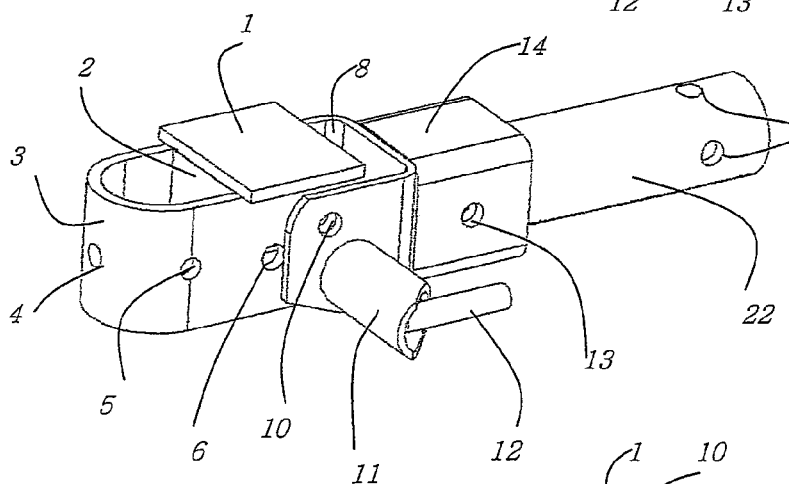
FIG. 10 is a diagrammatic view of folding drop leg for trailer jack assembly shown with mast leg inserted into leg mount body angled view in raised or horizontal retracted position.

FIG. 10 shows the folding drop leg for trailer jack head assembly with a mast leg 22 inserted into leg mount body 14 at an angled view in the raised or retracted horizontal position.

The mast leg 22 is mounted to the drop leg for trailer jack head assembly by the use of a leg mounting bolt 16 inserted through the leg mount hole 13 and the leg hole 24 and is secured into place by installing the leg mounting washer 18 and the leg mounting nut 17 onto the leg mounting bolt 16 accordingly. By combining the folding drop leg for trailer head assembly with the leg, it forms the complete folding drop leg for a trailer jack and while retracted, is now ready for the trailer to be towed.

Figure 11:
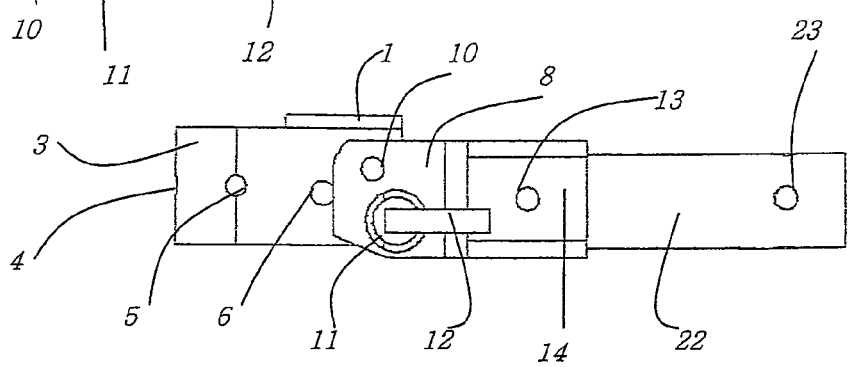
FIG. 11 is a diagrammatic view of a folding drop leg for trailer jack assembly shown with mast leg inserted into leg mount body side view in raised or horizontal retracted position.

FIG. 11 shows the folding drop leg for trailer jack head assembly with a mast leg 22 inserted into leg mount body 14 at a side view in the raised or retracted horizontal position. The mast leg 22 is mounted to the drop leg for trailer jack head assembly by the use of a leg mounting bolt 16 inserted through the leg mount hole 13 and the leg hole 24 and is secured into place by installing the leg mounting washer 18 and the leg mounting nut 17 onto the leg mounting bolt 16 accordingly. By combining the folding drop leg for trailer head assembly with the leg, it forms the complete folding drop leg for a trailer jack and while retracted, is now ready for the trailer to be towed.

Figure 12:
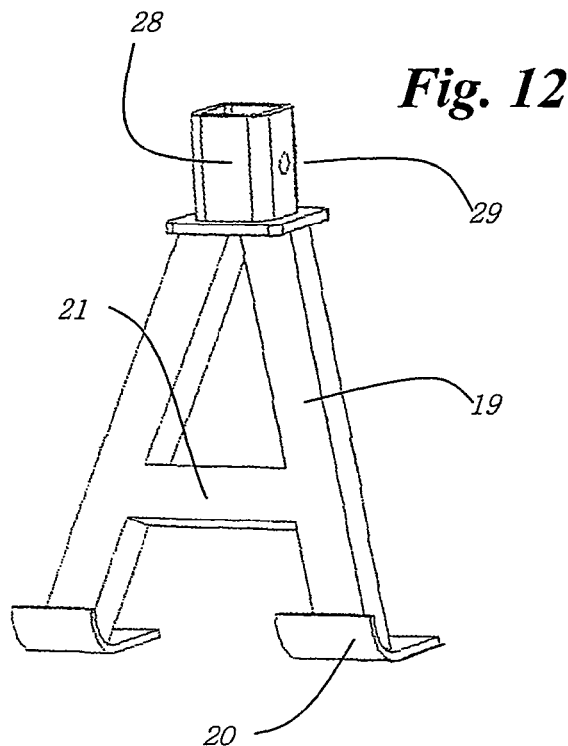
FIG. 12 is a diagrammatic view of an a-frame leg.

FIG. 12 shows the a-frame leg outside of the leg mount body 14 which is composed of a leg mounting base 28 with mounting base holes 29 for the purpose of mounting the leg to the leg mount body 14 by the passing of the leg mounting bolt 16 through the leg mount body and the leg mounting base and securing it in place with the leg mount washer 18 and the leg mount nut 17. The a-frame leg itself is composed of two opposing angled legs joined in the center by a cross brace 21 and welded with a weld seam to the leg mounting base 28. Each of the angled legs has a base foot 20 opposite of the leg mounting base 28 connected to them with a weld seam to add a more stable contact with the ground.

Figure 13:
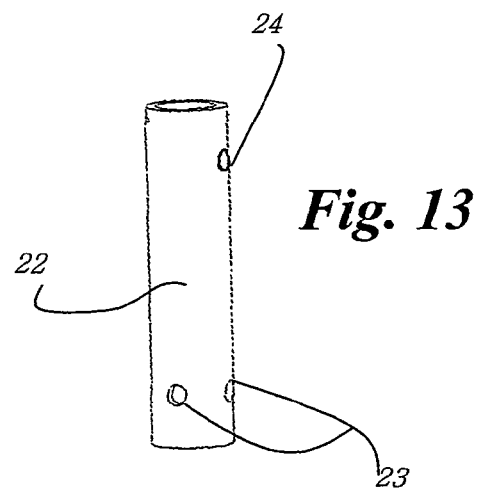
FIG. 13 is a diagrammatic view of a mast leg.

FIG. 13 shows the mast leg 22 outside of the leg mount body which is composed of a straight piece of round tubing with an outside diameter slightly less than the inside diameter of the leg mount body 14 and connected to the leg mount body 14 by the passing of the leg mounting bolt 16 through the leg mount body 14 and the leg mounting hole 24 and securing it in place with the leg mount washer 18 and the leg mount nut 17. The opposing end of the mast leg 22 allows for a variety of available jack accessories such as, but not limited to a standard trailer jack foot or trailer jack wheel to be attached by the use of the jack accessory mounting holes 23.

Figure 14:
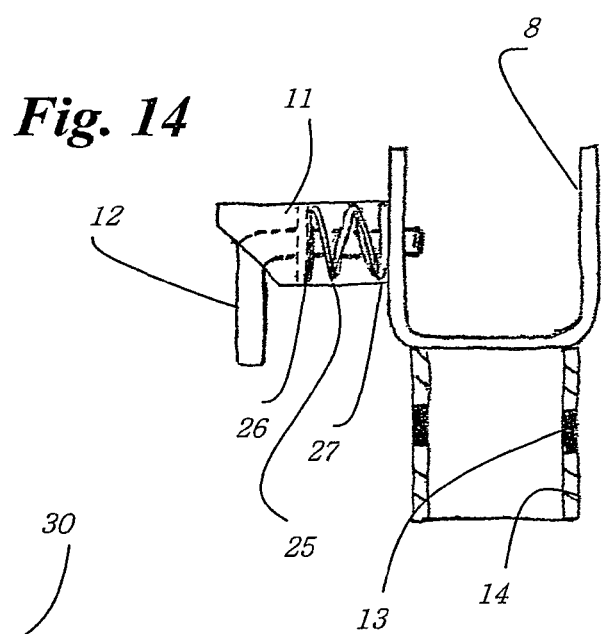
FIG. 14 is a diagrammatic view of a swing plate with leg mount body and automatic locking pin assembly.

FIG. 14 shows a view of the swing plate with leg mount body and automatic locking pin assembly not connected to the mounting base plate. Shown is the automatic locking pin shell 11 that is welded to the side of the swing plate cradle 8 using a weld seam. Within this automatic locking pin shell 11 is a automatic locking pin 12 which uses tension provided by the automatic lock spring 25 which is compressed between the automatic lock retaining washer 26 and the automatic spring binder and stop, all of which is held in the automatic locking shell by a set of opposite retaining dimples and allows the movement of the automatic locking pin 12 into the down swing automatic locking hole 6 in the mounting base plate when the two are aligned when hinged in the dropped or extended vertically position.

Figure 15:
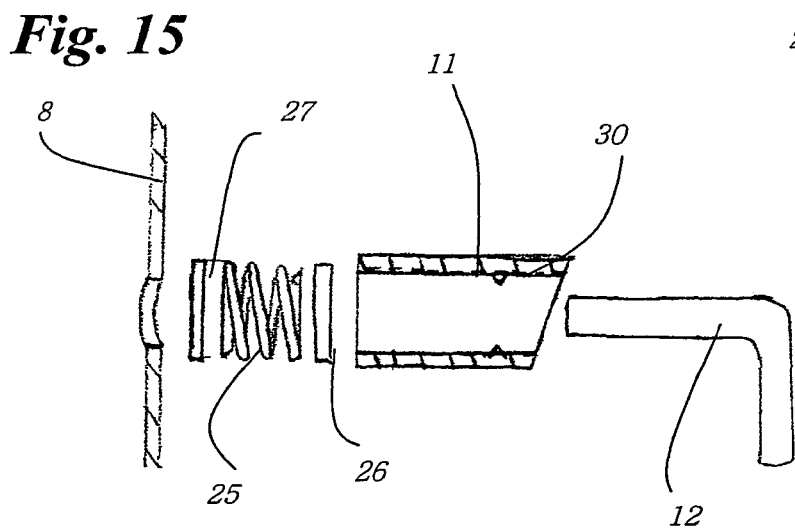
FIG. 15 is an exploded diagrammatic view of a automatic locking pin assembly.

FIG. 15 shows an exploded view of the automatic locking pin used to secure the folding drop leg for a trailer jack in either the dropped vertical extended position for supporting the trailer or the raised or horizontal retracted position for towing. It is composed of a shell 11 with retaining dimples 30, a locking pin 12, a automatic locking pin spring 25, a automatic locking pin spring retaining washer 26 and a automatic locking pin spring binder and stop 27, whereas the spring is biased between the retaining washer 26 and the binder and stop 27 in a way that creates spring pressure and an inward movement of the automatic locking pin 12 into the automatic locking hole downside 6 when in the dropped or vertical extended position or locked outside the mounting base plate when in the raised or horizontal retracted position by manually pulling the automatic locking pin outward tensioning the spring and releasing the pin form its locked position.

The invention claimed is:

1. A folding drop leg for a trailer jack comprising:
   a) a mount support;
   b) a swing plate cradle;
   c) an automatic locking pin;
   d) a hinge pin that mounts through said mount support and into said swing plate cradle, said hinge pin creating a hinge point that pivotally mounts said swing plate cradle to said mount support, allowing said swing plate cradle to swing from a horizontal position to a vertical position while keeping said mount support and said swing plate cradle connected together;
   e) a leg mount body mounted to an end of the swing plate cradle;
   f) a mast leg;
   wherein said mast leg is mounted into said leg mount body;
   wherein said mount support further comprises a plurality of apertures and is configured for attaching to a bottom of a trailer jack;
   wherein said automatic locking pin is mounted to a side of said swing plate cradle and said automatic locking in is configured to engage with respective apertures in the mount support and swing plate cradle when the swing plate is in said vertical position; thereby locking said swing plate cradle in said vertical position; and
   wherein said automatic locking pin is mounted in an automatic locking pin shell that is welded to the side of the swing plate cradle, said automatic locking pin shell containing a spring.

2. The folding drop leg for a trailer jack of claim 1, where said swing plate cradle is connected to said mounting base plate using a center hinge pin.

3. The folding drop leg for a trailer jack of claim 1, wherein in the extended position the drop leg supports the trailer.

4. The folding drop leg for a trailer jack of claim 3, where said drop leg moves to the drop position when the user pulls out the said automatic locking pin and allows the drop leg to rotate downward in the extended position.

5. The folding drop leg for a trailer jack of claim 4, where said drop leg moves to the stored position when the user pulls out the said automatic locking pin and lifts the drop leg upward until it locks into the stored position.

6. The folding drop leg for a trailer jack of claim 5, where said mast leg can be different lengths depending on the amount of leg length needed.

7. The folding drop leg for a trailer jack of claim 6, where said mast leg, is of the same dimension of the trailer jack bottom to allow the use of a variety of already available jack attachments without modification.

8. The folding drop leg for the trailer jack of claim 7, where the variety of already available jack attachments available are various feet or a wheel.

9. The folding drop leg for a trailer jack of claim 8, where said mast leg is mounted to said leg mount body by sliding it into the leg mount body.

10. The folding drop leg for a trailer jack of claim 9, where said mast leg can be an a-frame for added strength and stability.

* * * * *